United States Patent [19]

Lefevre et al.

[11] 4,395,448

[45] Jul. 26, 1983

[54] FILLING SHEET ATTACHING MEANS FOR GAS AND LIQUID CONTACT APPARATUS AND METHOD OF ASSEMBLY OF PLURAL PARALLEL FILLING SHEETS

[75] Inventors: Marcel R. Lefevre, Branchburg; Anthony M. DePalma, So. Plainfield, N.J.

[73] Assignee: Research-Cottrell, Inc., Somerville, N.J.

[21] Appl. No.: 333,409

[22] Filed: Dec. 22, 1981

[51] Int. Cl.³ .............................................. B32B 3/06
[52] U.S. Cl. ...................................... 428/99; 428/116; 428/156
[58] Field of Search ...................... 428/99, 116, 156

[56] References Cited

U.S. PATENT DOCUMENTS

| | | | |
|---|---|---|---|
| 1,000,758 | 8/1911 | Rude | 428/116 X |
| 2,007,374 | 7/1935 | Kuehne | 108/13 |
| 2,910,153 | 10/1959 | Campbell | 428/116 X |
| 2,959,257 | 11/1960 | Campbell | 428/116 |
| 3,899,805 | 8/1975 | McMillan | 428/99 |

*Primary Examiner*—Marion McCamish
*Attorney, Agent, or Firm*—Kerkam, Stowell, Kondracki & Clarke

[57] ABSTRACT

Filling sheets are disclosed for use in a gas and liquid contact apparatus. The sheet members are identical and each of the sheet members has a plurality of male type and female type locking tabs. The tabs are positioned in rows and columns and male type tabs in any row or column are adjacent a female type tab whereby rotation of alternate sheets 180° bring the male and female type tabs of alternate sheets into alignment.

3 Claims, 13 Drawing Figures

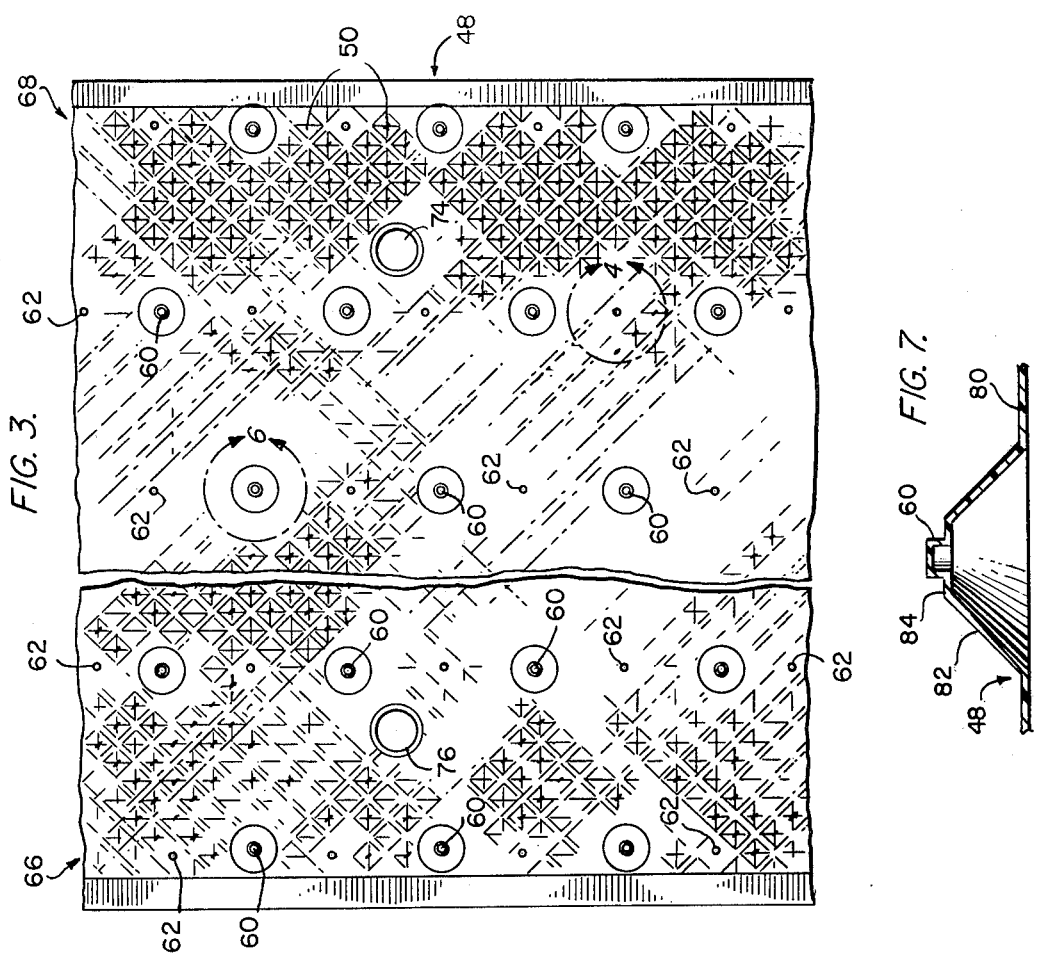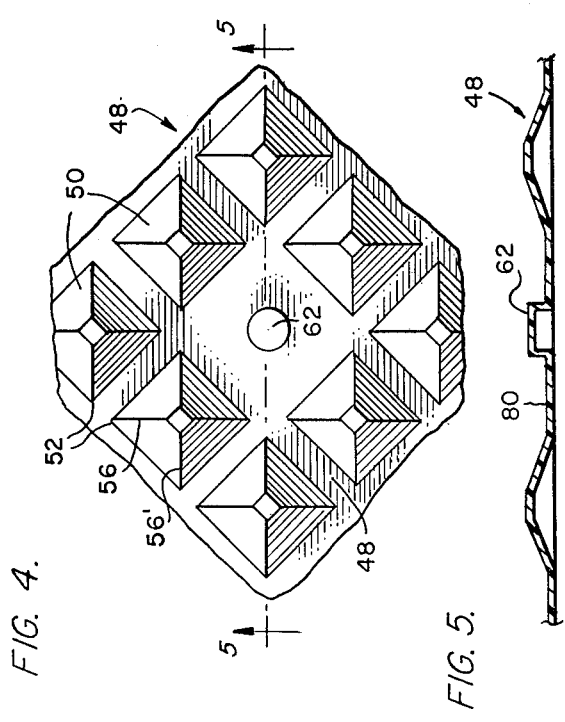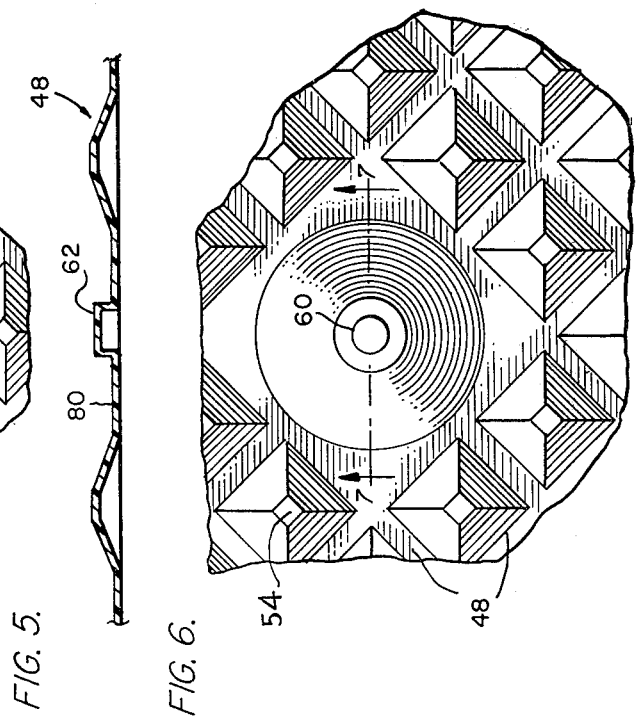

FILLING SHEET ATTACHING MEANS FOR GAS AND LIQUID CONTACT APPARATUS AND METHOD OF ASSEMBLY OF PLURAL PARALLEL FILLING SHEETS

TECHNICAL FIELD

This invention relates to filling sheet attaching means for liquid contact apparatus for use in cooling towers where the mode of heat transfer is by film cooling. The invention is applied to contact mechanism between the liquid to be cooled and the gas to be heated.

The invention also comprises a method of attaching a plurality of parallel sheets of deformable material requiring no access to a sheet other than the exposed front sheet.

BACKGROUND OF THE PRIOR ART

Cooling towers are well known in the art and one type employs parallel filling sheets which are sprayed with the liquid to be cooled while atmospheric air flows between the wetted sheets.

It is well known in the art that the greater the surface area of fill, the greater is the cooling efficiency. However, the larger the surface area of the sheets the more difficult the assembly of the sheets, particularly where the plurality of sheets are shipped to a job site and assembled and attached one to another sheet at the job site.

BRIEF SUMMARY OF THE INVENTION

It is an object of the invention to produce a fill with a large surface area using sheets of minimum thickness while maintaining adequate stiffness which stiffness is inpart provided by forming each sheet with a plurality of mating "locking tabs" which are simply secured together from the exposed front face of the stacked sheets.

A further object is to provide locking tabs for a plurality of parallel sheets wherein each tab is formed on a male mold so that the material at the top of each tab is thicker than the thickness of the side walls of the tab.

BRIEF DESCRIPTION OF THE DRAWINGS

The invention will be more particularly described in reference to the accompanying drawing illustrating the features of the present invention inconjunction with a cooling tower for condenser water of a power generating station. In the drawings:

FIG. 3 is a plan view, of a typical fill sheet;

FIG. 4 is an enlarged view of the portion of FIG. 3 enclosed within the circle 4;

FIG. 5 is a section on line 5—5 of FIG. 4;

FIG. 6 is an enlarged view of the portion of FIG. 3 enclosed within the circle 6;

FIG. 7 is a section on line 7—7 of FIG. 6;

DETAILED DESCRIPTION OF INVENTION

Figure 1:
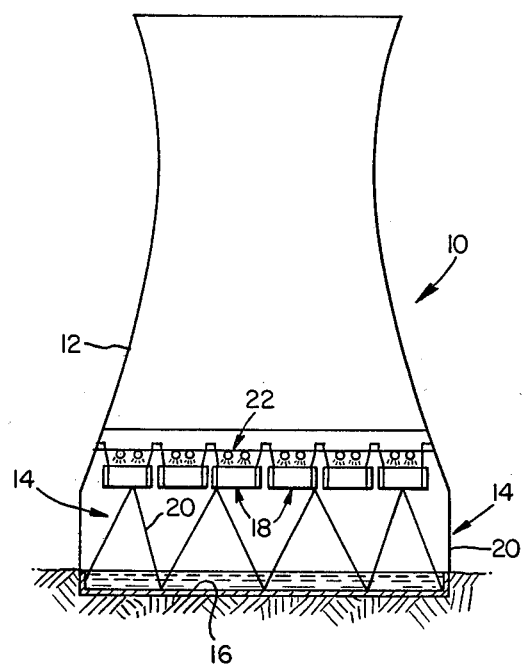
FIG. 1 is a fragmentary vertical sectional view through a typical natural draught cooling tower equipped with gas and liquid contact fill constructed in accordance with the teachings of the present invention.
Figure 2:
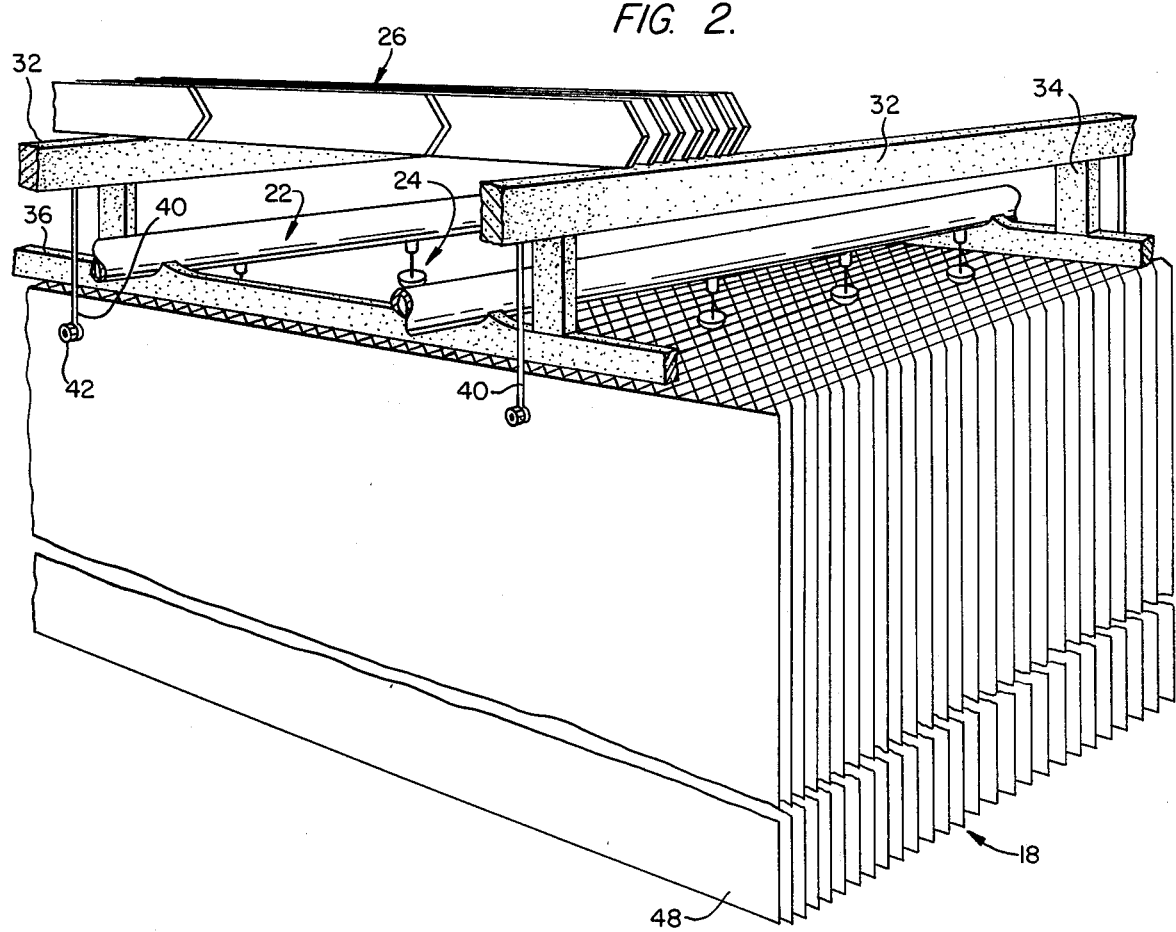
FIG. 2 is an enlarged fragmentary perspective view of a typical suspension system for the contact apparatus for the tower illustrated in FIG. 1.
Figure 10:
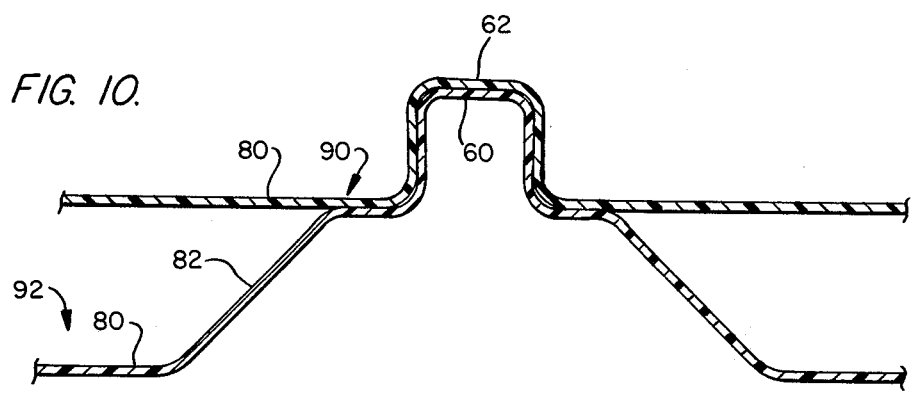
FIG. 10 is a view showing the locking tabs of FIGS. 8 and 9 in mating relationship.

Referring to FIGS. 1 and 2, 10 generally designates a typical atmospheric gas and liquid cooling assembly consisting of a chimney 12 having a peripheral inlet generally designated 14. About the peripheral inlet 14 is a catch basin 16 which in normal operation would contain a pool of liquid which is captured from the fill assemblies generally designated 18. The tower 12 is supported by legs 20 spaced about the base of the tower. Positioned above the fill 18 is a network of fluid conduits designated 22 which network of conduits is provided with a plurality of outlet sprays 24 which direct the fluid to be cooled flowing in the conduits 22 to the upper surface of the fill 18. Positioned above the network of conduits 22 is illustrated conventional mist or droplet eliminators 26.

In the illustrated form of the invention the conduits 22 are filled from a source not shown. The liquid collected in the pool or basin 16 is removed therefrom by one or more conduits and directed to a condensor or the like of, for example, a power generating station not shown.

In operation air entering the peripheral inlet 14 passes in counter-current heat exchange relationship by flowing upwardly through the fill assemblies 18 composed of a plurality or network or assembly of fill sheets. The cooled fluid passing downwardly across the surface of the sheet is then collected in the basin 16.

A typical support for the fill sheets assembly 18 is illustrated in FIG. 2 and comprises concrete or the like horizontal and vertical support beams designated 32 and 34 which network of support beams also includes cross-beams 36 which directly support the network of conduits 22 having the spray or fluid outlet means 24 associated therewith. In the illustrated form of the invention the upper surface of cross-beams 32 support the droplet eliminators 26 and hanger means such as rods 40 depending from the cross-beams 32 engage transverse bolts or pipes 42 which as to be more fully described hereinafter support the fill sheet assemblies 18.

The tower and the supporting means for the fill assembly 18, the fluid distribution conduits 22 and the mist eliminators 26 described in reference to FIGS. 1 and 2 are by way of example only.

Referring now particularly to FIGS. 3 through 7 each fill sheet 48 of the fill sheet assembly 18 is formed of a deformable composition such as a heat formable plastic such as polyethylene.

Each of the sheets may be of any desired width and length and by way of example the sheets are 2' wide and 6' in length. The surface of each sheet is formed with a plurality of truncated four sided pyramids having a diagonal dimension of about 1". The heighth of each of the truncated pyramids 50 is about 0.2 inch above the plane of the base sheet 48. The spacing between diagonal corners 52 is about 0.2 inch and the diagonal dimension of the tops 54 of each of the truncated pyramid is about 0.2 inch. The pyramids are such that the diagonals 56 and 56' are in the vertical and in the horizontal directions respectively when the sheet is installed in an assembly of sheets as depicted in FIG. 2 of the drawing.

Each of the sheets 48 is provided with a plurality of locking tabs configured as "male" and "female" interlocking elements generally designated 60 for the male tabs as more clearly shown in FIGS. 6 and 7 and 62 for the female tabs as more clearly shown in FIGS. 4 and 5.

As shown in FIG. 3, the male and female type tabs 60 and 62, are arranged in horizontal and vertical rows in alternate succession.

In the illustrated form of the invention, the vertical rows 66 and 68 are positioned with the center of each male tab about 1.2" from the side margins of the sheet and the remaining rows about 5.4" spacing on centers. In respect to the horizontal rows, the first and last rows are positioned about 1.2" from the top and bottom edges and the remaining rows are positioned about 3" on center.

It will also be noted from FIG. 3 that there are a pair of circular openings 74 and 76 in each sheet. These openings 74 and 76 are positioned about 12" from the top margin and about 4.8" from their respective side margins of the sheet of the example. The openings 74 and 76 receive hanger pipes to which the hanger rods 40 and the fasteners 42 engage again as shown in FIG. 2.

Referring specifically to FIGS. 4 and 5, the female type tabs 62 are formed in the centers of one of the squares of the sheet 48 and project upwardly from the surface 80 thereof about 0.25" and each of the female like tab 62 have a diameter of approximately 0.25". The male tabs as shown in FIGS. 6 and 7 are formed as a top portion of a circular truncated pyramid 82, the tops 84 of which have a diameter of about 0.5" and the base of which has a diameter of about 1.5" with the top 84 projecting about 0.59" above the surface 80 of the surrounding sheet material.

As hereinbefore described, the fill assembly 18 are made up of layers of the fill sheets 48 positioned one against the other.

In order to assemble the sheets certain of the locking tabs must fit within certain other locking tabs. Referring specifically to FIG. 3, locking tabs 60 are of the male variety and tabs 62 are of the female variety. While these tabs have been designated male variety and female variety the designation relates to size rather than how the tabs are formed for as to be more fully described hereinafter both the female and male variety tabs are formed on male molds.

After the sheets have been formed, they are stacked one on top of another for shipment to a site for erection. At the site the sheets are assembled into the fill illustrated, for example, in FIG. 2 by rotating every other sheet 180° in the plane of the sheets.

The purpose of rotating every other sheet 180° in the plane of the sheets is to bring male type tabs into alignment with female type tabs, this being so even through all of the sheets are formed on the same mold or vacuum formed and the sheets as formed are identical.

Figure 9:
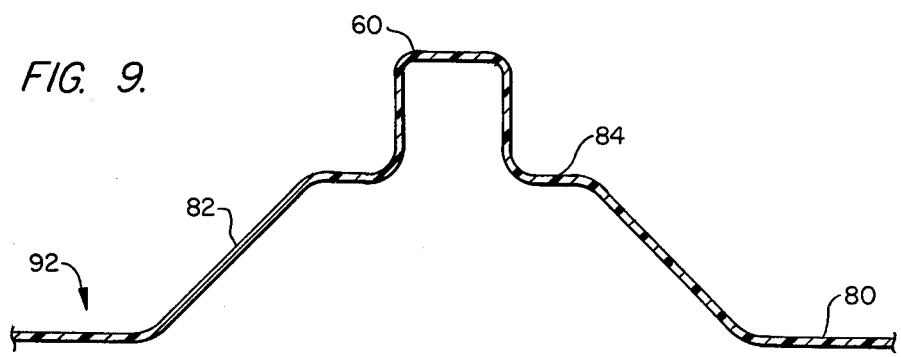
FIG. 9 is an enlarged view like FIG. 7 of a male locking tab.
Figure 11:
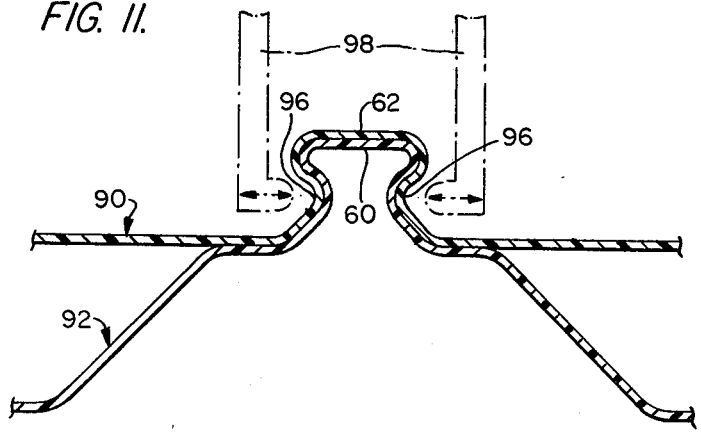
FIG. 11 illustrates the mated pair of locking tabs after the tabs have been heat or pressure crimped.

Referring now to FIGS. 9 through 11, the function of the novel locking tabs are illustrated on an enlarged scale with designations for the tabs corresponding to the designations of FIGS. 3, 4, 5, 6 and 7.

Figure 8:
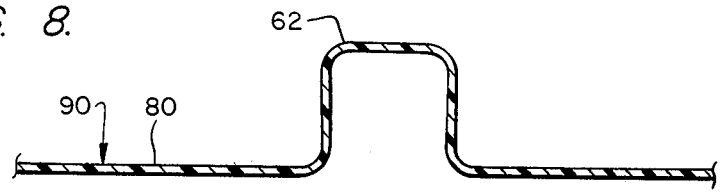
FIG. 8 is an enlarged view like FIG. 5, of one of the female locking tabs formed in accordance with the invention.

FIG. 8 illustrates a portion 90 of a sheet 48 having a female tab 62 whereas FIG. 9 illustrates a similar portion 92 of a sheet 48 having a male tab 60. In FIG. 10 assembly of sheets portions 90 and 92 illustrates the nesting ability of the male and female tabs 60 and 62.

The sheets assembled with the mating locking tabs as shown in FIG. 10 will adequately hold the sheets in their assembled relationship in many instances. The locking tabs can be used in two modes: self locking without heat crimping in which case the fill is preferably hung as illustrated in FIG. 2, or, with heat crimping in each case the fill is strong enough to accept compression loads without buckeling and it can be used as bottom supported fill not specifically illustrated in the drawing. Now in order to secure the sheets one to another, without access to face 80 of portion 82 the nested locking tabs are subjected to heat crimping solely from face 90 of the outer most sheet 48 to provide the indentures 96 rather permanently locking the sheets 48 together.

The indentures 96 may completely surround the locking tabs or appear only on a single side and where the material of construction of sheets 48 is of a heat deformable plastic composition such as the polyethylenes an electrically heated crimping tool 98 having manually actuated crimping jaws may be employed. If the sheets are formed of a metallic material then the crimping would be of a mechanical nature only.

Being able to secure the sheets having access to only the outer face is of utmost importance in assembling the multiplicity of sheets necessary to form fill for a large cooling tower as illustrated in FIGS. 1 and 2 of the drawing.

In FIG. 11 there is illustrated by broken lines a two jawed heat sealing device designated 98 which jaws are moveable toward and away from each other as illustrated by the directional arrows. The jaw elements of the device 98 form the electrical resistance elements of a electrical heater not shown in the drawing.

Figure 12:
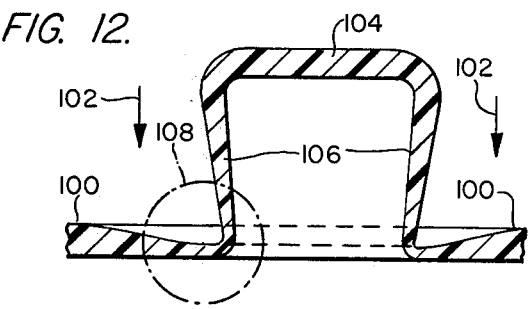
FIG. 12 illustrates a tab formed on a male mold.
Figure 13:
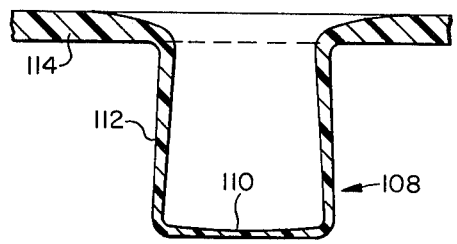
FIG. 13 illustrates a tab as shown in FIG. 12 formed on a female mold.

Referring now to FIGS. 12 and 13, FIG. 12 diagramatically illustrates the effect of forming either male or female type locking tabs in a male die. In a male die, the basic portion of the sheet of the thermoplastic material 100 is urged downwardly in the direction of the directional arrows 102 leaving the upstanding tip portion 104 of the locking tab of substantially the same thickness as the thickness of the base sheet 100; the drawing movement being taken up by the sidewalls 106 of the tabs producing thin portions such as illustrated in the dotted circle 108.

FIG. 13 illustrates the effect of forming a tab 108 on a female dye and it will be noted that the tip portion 110 and the upper portions of the side walls 112 have been materially thinned out compared to the thickness of the base stock 114 thus forming a locking tab having substantially less plastic material to crimp seal with its counterpart.

STATEMENT OF INDUSTRIAL APPLICATION

Fill sheets are provided with novel locking tabs, whereby the sheets may be assembled in closely stacked relationship and crimped lock in such relationship thereby reducing the tendency of the sheet to buckle or bend and substantially simplifying field erection of the sheets in a cooling tower.

We claim:

1. Filling sheets for a gas and liquid contact apparatus comprising a plurality of identical sheet members, each of said sheet members having a plurality of male type and female type locking tabs, said tabs being positioned in rows and columns and male type tabs in any row or column being adjacent a female type tab whereby rotation of alternate sheets 180° bring the male and female type tabs of said alternate sheets into alignment.

2. The filling sheets as defined in claim 1 wherein the sheets comprise plastic and the cooperating locking tabs are formed in male dies and form male and female connectors.

3. The filling sheets as defined in claim 2 wherein the locking tabs are heat sealed as they are assembled.

* * * * *